Patented Feb. 14, 1933

1,897,210

UNITED STATES PATENT OFFICE

CLAYTON OLIN NORTH, OF AKRON, OHIO, ASSIGNOR TO THE RUBBER SERVICE LABORATORIES CO., OF AKRON, OHIO, A CORPORATION OF OHIO

PROCESS OF MANUFACTURING ALDEHYDE-AMINE REACTION PRODUCTS

No Drawing.   Application filed March 29, 1926. Serial No. 98,361.

The present invention relates to an improvement in the process of manufacturing certain aldehyde-amine reaction products and particularly to the use of butyl-aldehyde in the manufacture of such materials. The invention is directed more particularly to the manufacture of a class of substances useful in promoting the acceleration of the rubber vulcanization process by employing for that purpose certain new compounds prepared according to the process hereinafter fully set forth and described.

In a patent (No. 1,467,984) granted to me on September 11, 1923, I have disclosed and claimed as rubber vulcanization accelerators, the aldehyde reaction products of Schiff's bases. These compounds are manufactured according to the process disclosed in an application Serial No. 627,326, filed March 24, 1923, which later matured in U. S. Patent 1,659,152. The present application is a continuation in part of the copending application referred to.

According to the present invention, butyl aldehyde is reacted with a primary aromatic amine such as aniline in varying proportions and the resulting products are employed as rubber vulcanization accelerators in the manner as is hereinafter set forth. Although the compounds particularly described may be manufactured by operating according to the process set forth in the application and patent hereinbefore mentioned, it is more convenient to modify slightly the reacting conditions as described, due to the higher boiling point of the aldehyde employed in the present invention.

As an example of my present invention, a butyl aldehyde-aniline reaction product may be prepared by maintaining at its boiling temperature of 72 to 73° C., with gentle refluxing 216 parts of butyl aldehyde (3 molecular proportions) and slowly adding thereto, 186 parts (2 molecular proportions) of aniline. The temperature is maintained by an appropriate means at such a point that the mass is refluxing during the entire change. As the reaction proceeds, water is produced by the condensation of the interacting substances. The water is substantially immiscible with the various materials present and in order to avoid violent bumping of the mass during the heating thereof, due to the accumulation and partial evaporation of condensed water in the reaction zone, it is desirable to withdraw from the container from time to time as much of the water as is possible. After all the aniline has been added to the aldehyde, the mixture is gently refluxed for a short period of time to insure that complete reaction has taken place. The temperature of the mixture slowly increases as the quantity of aldehyde employed is consumed, and after complete combination of the aldehyde and amine has taken place, the temperature is increased to approximately 145° C. and maintained thereat for a period of two to three hours or more if needed. The product is then dried preferably under a vacuum to remove any undue proportion of water remaining. The temperatures mentioned and the time of the various treatments as stated are not by any means certain and fixed conditions but are merely illustrative and are more or less arbitrarily chosen by way of example. The conditions may be changed as necessity requires during the manufacture of any desired material. The resulting product, which is a yellowish liquid is ready for use as a rubber vulcanization accelerator.

For this purpose, a mixture of 100 parts of rubber, for example of the grade known as pale crepe, 5 parts of zinc oxide, 3.5 parts of sulphur, and 0.5 parts of the compound obtained by reacting three molecular proportions of butyl aldehyde with two molecular proportions of aniline in the manner as described, is prepared in the well known manner by mixing on the rubber mixing mills and the rubber compound so obtained is vulcanized by heating in a press at a temperature given by forty pounds of steam pressure per square inch. After heating for approximately thirty minutes under these conditions, the resulting compound is found upon testing to possess a modulus of elasticity at 300 per cent. elongation of 198, at 500 per cent. elongation of 477, at 700 per cent. elongation of 1915, a tensile strength at break of 3995 pounds per square inch and an ultimate elongation of 850 per cent. The rubber compound vulcanized in the presence and by the aid of the accelerator mentioned possesses desirable and high qualities.

Results practically identical with those described may be obtained by using as an accelerator the compound obtained by reacting 108 parts butyl aldehyde with 93 parts of aniline, that is, by combining 1.5 molecular proportions of the aldehyde with 1 molecular proportion of the amine. Other proportions of aldehyde and amine have been found to react to produce a product having desirable properties as a vulcanization accelerator. Thus 2 molecules of butyl aldehyde (144 parts) have been reacted with 1 molecule of aniline (93 parts), 3 molecules of aldehyde have been reacted with 1 molecule of amine and other proportions of the substances have been combined. While in general the most favorable results in the vulcanization process have been obtained by employing as accelerators those compounds in which the molecular proportions of aldehyde to amine have not exceeded the ratio of three to one, this does not necessarily limit the extent to which combination of the substances may take place.

This last product, that is the compound resulting from the reaction of 3 molecules of butyl aldehyde with 1 molecule of aniline, may be readily obtained by slowly adding 93 parts of aniline to 216 parts of butyl aldehyde maintained approximately at its boiling point in the manner as hereinbefore described. After all of the amine has been added to the aldehyde, the mixture is maintained for approximately twenty hours at a temperature of 80 to 100° C. or for a shorter time at a somewhat higher temperature to complete the reaction. Water of condensation may be removed from time to time if desired. The product is then purified, for example by steam distillation, and is then vacuum dried at a temperature preferably below 100° C. until the moisture contained has been reduced to the necessary minimum. The product which is a yellowish liquid is then ready for incorporation into a rubber mix for use as a vulcanization accelerator.

By compounding 0.5 parts of the accelerator just described into a mixture comprising 100 parts of a rubber such as pale crepe, 5 parts of zinc oxide, 3.5 parts of sulphur, and heating the resulting rubber compound for thirty minutes in a press at the temperature given by forty pounds of steam pressure per square inch, a vulcanization product is obtained which upon testing in the well known manner is found to possess a modulus of elasticity at 300 per cent. elongation of 240, at 500 per cent. elongation of 619, at 700 per cent. elongation of 2380, a tensile strength at break of 3940 pounds per square inch and an ultimate elongation of 795 per cent.

An excellent hard rubber compound may be obtained by compounding in the well known manner a mixture comprising 40 parts of rubber, for example pale crepe rubber, 5 parts of slaked lime, 15 parts of zinc oxide, 25 parts of sulphur, 10 parts of mineral rubber and 2 parts of one of my new type of accelerators such as the reaction product of 3 molecules of butyl aldehyde and 1 molecule of aniline. The mixture is vulcanized by heating for approximately one hour and forty-five minutes at the temperature given by forty pounds of steam pressure per square inch.

A compound suitable for use as a tread compound may be manufactured by mixing in the usual manner 31 parts of rubber of the variety known to the trade as smoke sheet, 20 parts of No. 2 amber rubber, 19 parts of carbon black, 20.5 parts of zinc oxide, 2.25 parts of sulphur, 1 part of a suitable softener such as a blended mineral and vegetable oil, 3.5 parts of mineral rubber, and 0.625 parts of one of my new accelerators of the type hereinbefore described, such as the reaction product of 3 molecules of butyl aldehyde with 1 molecule of aniline. The resulting composition is then vulcanized by heating for approximately one hour and thirty minutes in a press maintained at the temperature given by approximately forty pounds of steam pressure per square inch. The vulcanized product upon testing is found to possess a modulus of elasticity at 300 per cent. elongation of 1415, at 500 per cent. elongation of 3200, a tensile strength at break of 3888 pounds per square inch and an ultimate elongation of 590 per cent.

Other means of employing my new type of accelerators are apparent to those skilled in the art of rubber compounding.

Although in the examples given, I have limited myself to the use of a reaction product prepared by the combination of butyl aldehyde with aniline, it is to be understood that other primary aromatic amines advantageously may be employed. Thus in place of aniline as mentioned in the examples, I may use corresponding molecular proportions of the toluidines, the xylidines, p-aminocymene as well as other primary aromatic amines capable of forming a reaction product with butyl aldehyde. Furthermore, inasmuch as butyl aldehyde when maintained at the boiling point, crotonizes, that is reacts by the condensation of two molecules of the aldehyde to produce alpha ethyl-beta propyl acrolein, the product may contain a certain proportion of the reaction product of this, or a related substance, with the amine.

My invention then comprises a means of manufacturing a reaction product of butyl aldehyde, or of a polymerization or condensation product or derivative thereof with an aromatic primary amine, where other than equi molecular proportions of the aldehyde and amine are employed, and the use of the product so obtained as rubber vulcanization accelerators. My invention is to be understood as not limited in scope by any examples given by way of illustration of a preferable mode of operation but is to be considered as limited solely by the claims attached hereto as a part of this specification and in which I intend to claim all novelty inherent in my invention as is permissible in view of the prior art.

What I claim is:

1. The process of manufacturing a butyl aldehyde-amine reaction product which comprises refluxing about three mols of butyl aldehyde with one mol of aromatic primary amine, removing water of condensation produced by the reaction of the aldehyde and amine and heating the reaction product so formed at substantially 100 to 145° C. for substantially 2 to 20 hours.

2. The process of manufacturing a butyl aldehyde-aniline reaction product which comprises refluxing about three mols of butyl aldehyde with one mol of aniline, removing the water of condensation produced by the reaction of the aldehyde and aniline and heating the reaction product so formed at substantially 100° to 145° C. for substantially 2 to 20 hours.

3. A butyl aldehyde-amine reaction product obtained by refluxing about three mols of butyl aldehyde with one mol of an aromatic primary amine, removing water of condensation produced by the reaction of aldehyde and amine and heating the reaction product so formed at substantially 100° to 145° C. for substantially 2 to 20 hours.

4. A butyl aldehyde-aniline reaction product obtained by refluxing about three mols of butyl aldehyde and one mol of aniline, removing water of condensation produced by the reaction of the aldehyde and aniline and heating the reaction product so formed at substantially 100° to 145° C. for substantially 2 to 20 hours.

Signed at Akron in the county of Summit and State of Ohio this 22 day of March A. D. 1926.

CLAYTON OLIN NORTH.